United States Patent Office 3,396,905
Patented Aug. 13, 1968

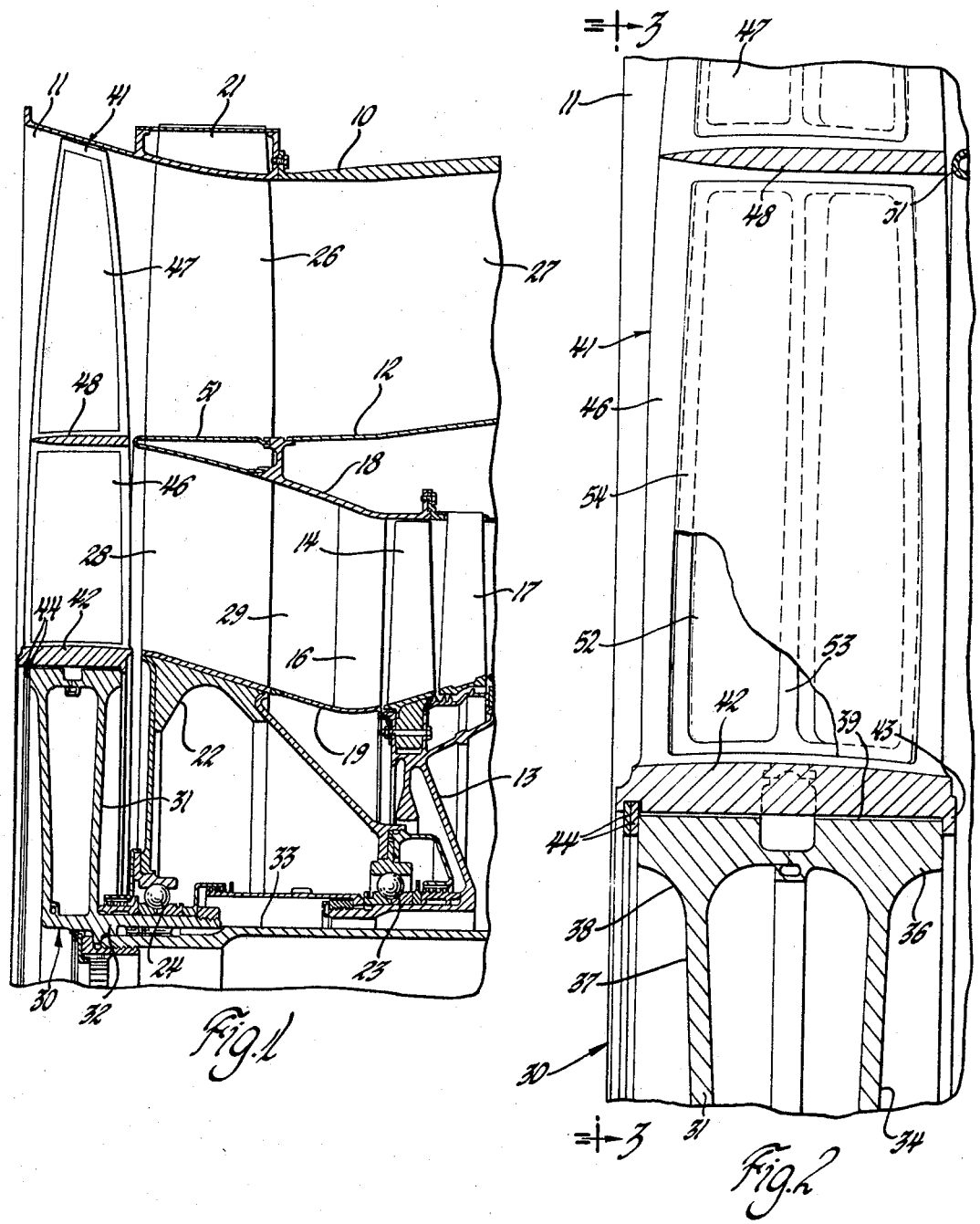

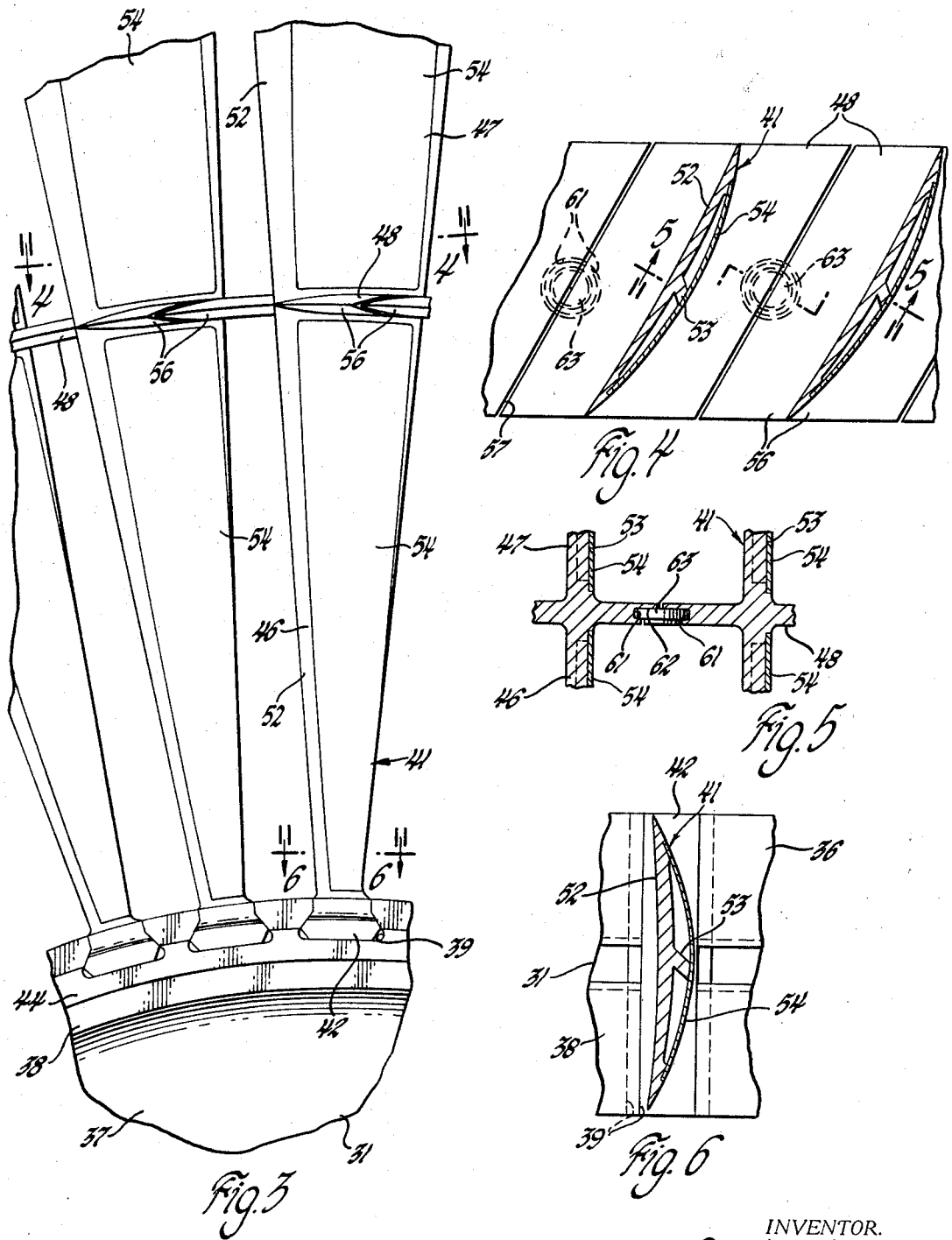

3,396,905
DUCTED FAN
Douglas Johnson, Indianapolis, Ind., assignor to General Motors Corporation, Detroit, Mich., a corporation of Delaware
Continuation-in-part of application Ser. No. 419,097, Dec. 17, 1964. This application Sept. 28, 1966, Ser. No. 584,623
5 Claims. (Cl. 230—122)

ABSTRACT OF THE DISCLOSURE

A single stage fan for a ducted fan aircraft engine has an annular flow splitter on the fan blades immediately upstream of the annular wall dividing the by-pass duct from the compressor inlet. There is no blading or splitter ahead of the fan. The splitter structure embodies frictional vibration dampers.

---

This application is a continuation-in-part of my application Ser. No. 419,097 filed Dec. 17, 1964, for Ducted Fan.

My invention relates primarily to axial-flow fans and turbomachine rotor stages and particularly to such fans as are employed as the first stage of jet engines of the ducted fan or bypass type. The invention is described herein in its preferred embodiment in a ducted fan engine. In such an engine, a turbojet engine comprising a compressor, combustion apparatus, and a turbine is mounted within an annular bypass duct. A fan of large diameter, ordinarily single-stage, is mounted ahead of the compressor of the turbojet engine and delivers air both to the inlet of the turbojet and the inlet of the bypass duct. The fan may be driven by a second or low pressure turbine. The air delivered by the ducted fan contributes to the thrust of the engine. It may be combined with the exhaust from the turbines to provide a propulsive jet through a single outlet, or there may be separate jet nozzles for the turbines and the bypass duct. It is customary for such fans to be mounted in the inlet to the engine without any fixed stator stage ahead of them. However, a fixed annular flow spliter may divide the inlet into outer and inner passages ahead of the rotating fan, and inlet guide vanes may be disposed ahead of the fan. Downstream of the fan there is fixed structure including, ordinarily, a row of stator vanes and an annular leading edge of the structure which divides the flow between the outer or bypass duct and the inner duct or turbojet engine inlet.

According to my invention, the division of flow between the inner and outer ducts is effected not by a fixed structure ahead of or downstream of the fan, but by a flow splitter on the rotating inlet stage of the fan, this flow splitter being mounted ahead of the stationary structure of the fan stator.

The flow splitter preferably serves a second useful function, by incorporating vibration-damping means of a frictional energy-absorbing type, which damps relative vibration or flutter of the blades. This is important because in modern bypass engines the fan blades are long and thin and present troublesome vibration problems.

The nature of the invention and the advantages thereof will be apparent to those skilled in the art from the succeeding detailed description of the preferred embodiment of the invention and the accompanying drawings thereof.

FIGURE 1 is a partial sectional view, taken on a plane passing through the axis of the engine, of the forward or air inlet end of a ducted fan type gas turbine jet engine.

FIGURE 2 is an enlarged view of a portion of FIGURE 1 showing the rotor wheel and blades to a larger scale.

FIGURE 3 is a partial front elevation view of the rotor stage.

FIGURE 4 is a sectional view of the rotor stage taken on the plane indicated by line 4—4 in FIGURE 3.

FIGURE 5 is a detail sectional view taken on the plane indicated by the broken line 5—5 in FIGURE 4.

FIGURE 6 is a detail sectional view taken on the plane indicated by the line 6—6 in FIGURE 3.

Referring to the drawings and particularly to FIGURE 1, the forward or air inlet end of a ducted fan jet engine is illustrated. Since the structure embodying the invention is located at the inlet of the engine, it is unnecessary to show the entire engine structure. The engine comprises a stationary outer case 10 extending from an air inlet 11 which may be open directly to atmosphere or be supplied with air through suitable ducting, depending upon the nature of the installation. The case 10 defines the outer wall of the bypass duct 27, the inner wall of which is defined by a generally cylindrical shroud 12. A portion of the rotor 13 of the compressor of a gas turbine engine is illustrated, the rotor including first stage compressor rotor blades 14. The compressor also includes inlet guide vanes 16 and first stage stator vanes 17, as well as additional stages not illustrated. The compressor inlet 29 is defined by an outer annular wall 18 and an inner annular wall 19. The walls 12, 18 and 19 are supported from the outer case 10 by a ring of fan stator vanes 21 which extend from the outer case to a bearing support assembly 22 within the compressor inlet. Assembly 22 supports a bearing 23 at the forward end of compressor rotor 13 and a bearing 24 for the fan rotor to be described. Vanes 21 comprise two major portions from the aerodynamic standpoint, which are vanes 26 in the bypass duct 27 and vanes 28 in the entrance to the compressor inlet duct 29.

The fan rotor 30 which is mounted in the air inlet just ahead of the vanes 21 comprises a wheel 31 having a hub 32 mounted in bearing 24 and fixed to a driving shaft 33. Wheel 31 is preferably a composite welded structure (see FIGURE 2), embodying a rear disk 34 integral with the hub 32 and having a rim 36, and a forward disk 37 welded to the hub and having a rim 38 welded to rim 36.

Referring also to FIGURE 3, dovetail slots 39 extending across the wheel rim 36, 38 receive fan blades 41. The blades 41 have roots 42 received in the dovetail slots with lugs 43 abutting the rear face of the wheel. The forward ends of the roots overhang the wheel and the blades are locked in position by expanding rings 44 received in notches in the blade roots. The blade 41 may be a single twisted airfoil, but it is desirable to refer to a radially inner portion 46 which supplies air to the gas turbine engine through vanes 28 and inlet 29, and an outer portion 47 which supplies air to the bypass duct 27 through vanes 26. These two portions of the blades are demarked by the flow splitter 48. The flow splitter is immediately forward of a flow dividing fairing or shroud 51 mounted on the struts 21. This flow dividing fairing provides a transition into the inner wall 12 of the bypass duct and outer wall 18 of the compressor inlet. It is a recurved or folded sheet metal ring.

While the blades 41 could be solid and of one piece, it is considered desirable to use a composite blade to reduce weight. As shown most clearly in FIGURE 6, the blade comprises a heavy spar or plate 52 defining the high pressure or concave face of the blade, which has a rib 53 extending from its convex side. A light sheet metal plate 54 brazed or otherwise fixed to the rib 53 and to the spar 52 adjacent its leading and trailing edges provides the major portion of the low pressure or convex face of the blade. This structure is present in both the portions 46 and 47 of the blade. Between these portions, however, the flow splitter 48 is defined by flanges 56 (FIGURES 3, 4 and 5) extending from the spar 52. These flanges preferably extend from the leading to the trailing edge of the blade and extend laterally to such an extent as to leave only a quite narrow gap 57 between the flanges of the adjacent blades. This gap is essentially to allow for assembly tolerances and slight vibration. Thus, when all of the blades are installed, the flanges 56 define an essentially continuous annular flow splitter concentric with the axis of the fan 30 and dividing the air flowing through the stage into two flows directed into the several outlets.

The flow splitter flanges 56 are employed as part of means for damping vibrations of the blades 41, and the preferred structure for this is illustrated in FIGURES 4 and 5. Flanges 56 are machined at the lateral edge to define generally semicylindrical recesses 61 such that, when two adjacent blades are installed a recess of substantially circular outline is defined by the recesses 61. The radially outer surface 62 of the recess is in a plane parallel to the axis of the rotor. A generally button-shaped vibration damping body or disk 63 is mounted in each such recess. The body 63 is of such dimensions as to be capable of a small degree of movement in any direction from a position centered in the recess. Since centrifugal force exerted on the bodies 63 when the engine is in operation biases them against the surface 62, any relative motion of the adjacent flanges due to blade vibration will necessarily be accompanied by a rubbing between the flanges 56 and the body 63. Such rubbing will result in frictional damping of the vibration. Note that the disk 63 is in frictional contact with the outer surface 62 of the recess due to centrifugal force, but it does not wedge into a tapering space between the blades as do certain prior art vibration dampers which bias the blades apart and thus act to solidify a ring extending around the rotor.

It is true, of course, that the location of the flow splitter 48 on the blade must be determined primarily by the design of the engine which determines the relative flows through the bypass and through the gas turbine and thus the radial location of the splitter 48. However, in many cases the splitter 48 may be located reasonably near, if not at, the optimum position for damping any troublesome vibration of the blades. Also, when the preferred radius of the splitter to divide the air flow as desired is determined, the blades may be designed to adjust the stiffness of the blades to suit the provision of vibration dampers at this radius.

This completes the description of the physical structure in which the invention is embodied but it should be emphasized that it is highly significant that the flow splitter on the fan rotor stage determines the division of flow between the two outlet paths 27 and 29 rather than a fixed structure downstream (or upstream, for that matter) of the rotor stage. By putting the flow divider or flow splitter on the rotating entrance stage, an accurate division of the air flow is permitted and the flow path selection is precisely determined. The flow path division is made before any disturbance by the rotating stage which, in general, may cause some radial deflection of the flow through the stage. To express it another way, if the flow splitter 48 were omitted from the engine disclosed here, the division of flow between the two outlets would be effected by the fixed shroud 51 in the usual way. Just where the division between the two flows would be at the leading edge of the blade at which the air enters the stage would be doubtful, and considerable cut and try adjustment of the position of the shroud 51 might be necessary to secure the desired proportioning of the two outlet flows.

It is important that the damper be put in the flow splitter which is needed to improve fan operation and where the damper does not impede air flow or unnecessarily add weight to the fan blading. A damper disposed within the inner or outer flow paths rather than between them can significantly reduce fan air flow and efficiency.

The specific structure of my damper is compatible with a thin streamlined splitter structure. Also, incorporating the initial flow splitter structure of the fan on the rotating structure promotes a sharp splitter while permitting a thicker or more bluff structure in the wall between the ducts behind the fan rotor.

A review of certain characteristics of ducted fan turbine engines may aid in understanding the significance of my invention. The outer part of the blades discharge through a fixed duct and thus have constant outlet nozzle conditions. The inner part of the blades discharge through the compressor, combustion apparatus, and turbine of the gas turbine engine, and thus discharge against conditions varying with compressor speed and fuel flow. There is not a fixed ratio of flow between the two paths—the flow in the inner duct through the engine diminishes relative to the bypass flow as engine and fan r.p.m. decrease.

Dividing the flow by a fixed circumferential splitter extending ahead of the fan rotor reduces the flexibility of division of air between the turbine and the bypass. Dividing the flow only downstream of the fan rotor creates uncertainty as to the division due to radial components of flow across the rotor blades.

Also, while the blades disclosed are of essentially continuous contour over their entire span, it is possible to effect a modification in the blade configuration, such as setting angle, for example, at the definite separation between the two portions of the blade resulting from the presence of the splitter 48. This facilitates tailoring the two portions of the fan to the particular needs for air flow and pressure rise of the two paths. Even with blades of continuous contour, the division between inner and outer paths created by the splitter which eliminates radial flow makes possible a higher pressure rise through the outer portion of the fan rotor. In a particular case, the outer portion had a 1.6 pressure ratio while the inner portion had a 1.4 ratio.

The detailed description of the preferred embodiment of the invention for the purpose of explaining the principles thereof is not to be considered as limiting or restricting the invention since many changes may be made by the exercise of skill in the art.

I claim:

1. A rotor stage for an axial-flow turbomachine comprising, in combination, a wheel, a ring of blades on and extending radially from the wheel, an annular flow splitter structure extending between the blades intermediate the ends of the span of the blades and extending through the major part of the chord of the blades, the said structure being defined by flanges extending from the faces of each blade substantially into contact with corresponding flanges on adjacent blades, the flanges defining complementary opposed portions of recesses, the recesses having outer walls substantially perpendicular to the radius from the recess to the axis of rotation of the wheel and having lateral walls, and vibration-damping bodies disposed loosely in said recesses with clearance from the walls of the recesses providing for sliding movement relative to the flanges on the outer walls of the recesses transversely to the radial direction, the bodies being urged against the said outer walls by centrifugal force in operation of the stage.

2. The rotor stage as recited in claim 1 in which the rotor stage is a fan stage of a ducted fan turbojet engine.

3. A rotor stage as recited in claim 2 in combination with outlet ducting including fixed divider means downstream of and aligned with the flow splitter dividing the ducting into inner and outer ducts.

4. A rotor stage as recited in claim 1 in which the vibration-damping bodies are substantialy disk-shaped.

5. A rotary axial-flow fan comprising, in combination, an annular air inlet defining a radially undivided inlet flow path, a rotor stage receiving air directly from the said flow path, and stationary outlet structure receiving the discharge from the said rotor stage, the outlet structure including divider means dividing the outlet between radially outer and inner annular flow paths, the rotor stage including a wheel, a ring of blades extending radially from the wheel across the inlet and outlet flow paths immediately upstream of the divider means, an annular splitter extending between the blades and substantially across the chord of the blades terminating immediately upstream of the divider means effective to determine the division of flow between the said flow paths, the splitter being defined by flanges extending circumferentially from the faces of each blade substantially into contact with, but normally slightly spaced from, corresponding flanges on adjacent blades, the flanges defining complementary opposed portions of recesses having outer walls substantially perpendicular to the radius from the recesses to the axis of rotation of the wheel and having lateral walls, and vibration-damping bodies with radially outer faces urged against said outer walls by centrifugal force, the bodies being lodged loosely in said recesses with clearance from the lateral walls.

References Cited

UNITED STATES PATENTS

| | | | |
|---|---|---|---|
| 1,554,614 | 9/1925 | Allen | 253—77.4 |
| 2,169,233 | 8/1939 | Ponomareff | 230—120 |
| 2,454,115 | 11/1948 | Allen | 253—77.2 |
| 2,526,281 | 10/1950 | Ryan et al. | 253—77.2 |
| 2,772,854 | 12/1956 | Anxionnaz | 253—77.4 |
| 2,407,223 | 9/1946 | Caldwell | 230—122 |

FOREIGN PATENTS

| | | |
|---|---|---|
| 905,229 | 4/1945 | France. |
| 670,665 | 4/1952 | Great Britain. |
| 577,017 | 3/1942 | Great Britain. |
| 878,934 | 10/1961 | Great Britain. |

HENRY F. RADUAZO, *Primary Examiner.*